UNITED STATES PATENT OFFICE 2,528,001

PROCESS OF PREPARING 15-CARBOXY-DEHYDROEQUILENIN COMPOUNDS, AND PRODUCTS OF SUCH PROCESS

William S. Johnson, Madison, Wis., Jack W. Petersen, Oakland, Calif., and Carl David Gutsche, St. Louis, Mo., assignors to Wisconsin Alumni Research Foundation, Madison, Wis., a corporation of Wisconsin No Drawing. Original application October 1, 1946, Serial No. 700,380. Divided and this application November 13, 1947, Serial No. 785,824

19 Claims. (Cl. 260—397.1)

The invention of this application is directed to the production of certain 15-carboxy-dehydroequilenin compounds having a double bond in ring D, and to those compounds themselves; which are useful in the synthesis of steroids of the type in which both rings A and B are aromatic—and especially in the synthesis of equilenin and desoxyequilenin—and are produced by the fourth step of that synthesis.

The complete synthesis of these steroids involves five steps; which, however, except as will be indicated, we believe to be individually new. The claims of the present application are directed specifically to the fourth step, and to the products obtained thereby; and the first, second, third, and fifth steps form the subject-matter of four separate applications, respectively. The present application is a division, as are three of said four companion applications, of the fourth of those companion applications; which is directed specifically to the fifth step of the synthesis, and which is Serial No. 700,380, filed October 1, 1946. The filing of the divisional applications is in response to a requirement for division by the Patent Office, made in such parent application Serial No. 700,380, in which all five steps and their products were originally claimed.

Because the claims of the present applications are limited to the fourth step of the complete synthesis, only that step will be described in full detail in this application; and the other four steps will be set forth only in the general description.

The five steps of the complete synthesis of the steroids are as follows:

a. 1-keto-7-R-1,2,3,4-tetrahydrophenanthrene, in which R indicates a substituent in the class consisting of hydrogen and lower-alkoxy groups (including lower-aralkoxy groups) desirably either hydrogen or the methoxy group, is condensed with a lower-alkyl formate, conveniently ethyl formate, in the presence of sodium methoxide, and desirably in an inert solvent, such as benzene for example; to produce 1-keto-2-hydroxymethylene-7-R-1,2,3,4 - tetrahydrophenanthrene, as follows:

(1) 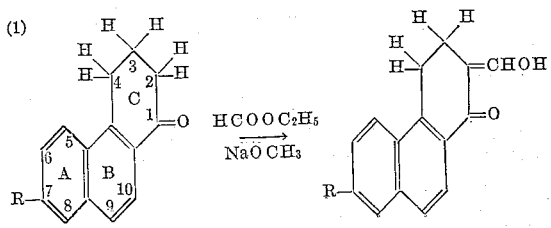

This product is new when R is an alkoxy or aralkoxy group, but not when R is hydrogen.

b. 1-keto-2-hydroxymethylene-7-R-1,2,3,4-tetrahydrophenanthrene is treated with hydroxylamine, desirably as the hydrochloride dissolved in acetic acid; to produce 10,11-dihydro-7-R-phenanthro[2,1-d]isoxazole, as follows:

(2) 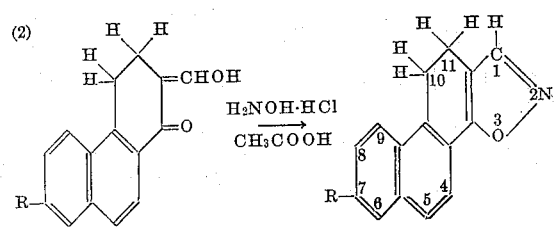

This product is new.

c. The 10,11-dihydro-7-R-phenanthro[2,1-d]-isoxazole, desirably in an inert solvent, benzene for example, is treated with an alkali-metal alkoxide, conveniently sodium methoxide, followed by a methyl heavy-halide, preferably methyl iodide but permissibly methyl bromide; to produce (first) 2-cyano-1-keto-7-R-2-sodio-1,2,3,4-tetrahydrophenanthrene, which is commonly not isolated, and (second) 2-cyano-1-keto-7-R-2-methyl-1,2,3,4-tetrahydrophenanthrene, as follows:

(3), (4) 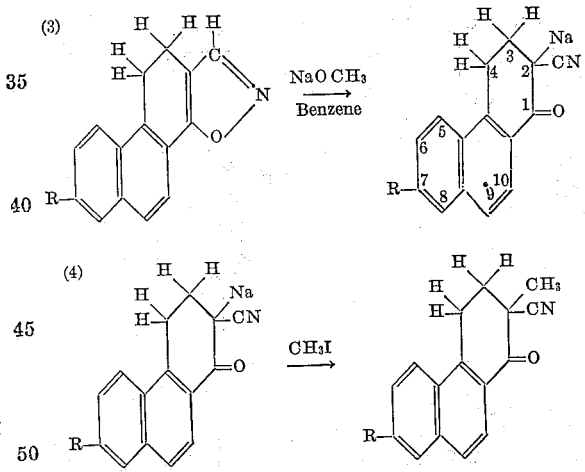

The products obtained by reactions 3 and 4 are new.

By treating the product of reaction 3 with a mineral acid, we can get a modification in which a hydrogen atom takes the place of the sodium atom; and, if desired, that modified product, after being treated with sodium methoxide, may be used as the starting point for reaction 4.

d. The 2-cyano-1-keto-7-R-2-methyl-1,2,3,4-tetrahydrophenanthrene is condensed with a di-lower-alkyl succinate, preferably dimethyl succinate, in the presence of an alkali-metal tertiary-lower-alkoxide, conveniently potassium tertiary-butoxide; preferably followed by treatment with a mineral acid, for instance hydrochloric acid; to produce a 15-carboalkoxy-14,15-dehydroequilenin ether or 15-carboalkoxy-14,15-dehydrodesoxyequilenin, according to whether R is a radical or hydrogen; and the product so obtained is hydrolyzed, desirably with barium hydroxide followed by hydrochloric acid, to give the free acid, a 15-carboxy-15,16-dehydroequilenin ether or 15-carboxy-15,16-dehydrodesoxyequilenin, as follows when the di-lower-alkyl succinate used is dimethyl succinate:

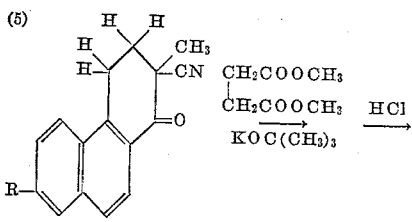

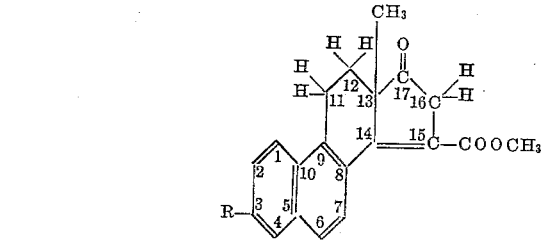

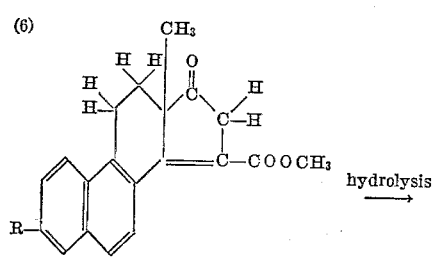

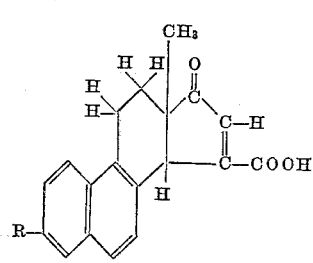

The products obtained by reactions 5 and 6 are new.

Reaction 6 is not only a hydrolysis of the carboalkoxy group at the 15 position to a carboxy group, but a shifting of the double bond from the 14–15 position to the 15–16 position. This shifting of the double bond is most surprising, and was not at first appreciated. No similar shifting of the double bond has been observed in reaction 5. The shifting of the double bond in reaction 6 may not be completely quantitative, but it occurs in such large degree that no absence of it has been observed in the reaction product.

e. This free acid, 15-carboxy-15,16-dehydroequilenin ether or 15-carboxy-15,16-dehydrodesoxyequilenin, is decarboxylated by heating under reduced pressure; to produce a mixture of two isomeric dehydroequilenin ethers or a mixture of two isomeric dehydrodesoxyequilenins according to whether R is a radical or hydrogen. The isomers of each pair probably differ by having a double bond in the 14,15-position on the one hand and in the 15,16-position on the other. This product, with or without separating its component isomers, is hydrogenated, desirably over a palladium-charcoal catalyst, to produce two compounds, one of which is a racemic equilenin ether or a racemic desoxyequilenin and the other of which is a racemic isoequilenin ether or a racemic desoxyisoequilenin, in each case according to whether R is a radical or hydrogen. The two compounds so produced are stereoisomers in each case. These two compounds are separated, as by fractional crystallization. In the case where R is hydrogen, this separation gives directly d,l-desoxyequilenin and d,l-desoxyisoequilenin. In the case where R is methoxy, the separated compounds are demethylated, by known methods, to obtain respectively d,l-equilenin and d,l-isoequilenin. The d,l-equilenin is resolved, by known methods, to obtain d-equilenin, which is found to be identical with natural equilenin. The main reactions involved are as follows:

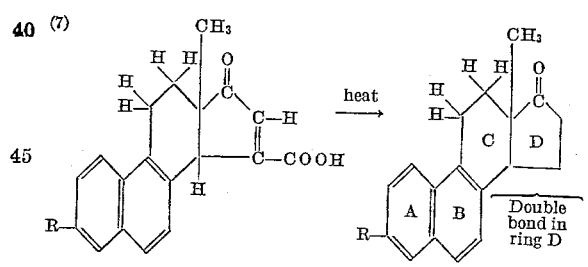

The products of reaction 7 are new.

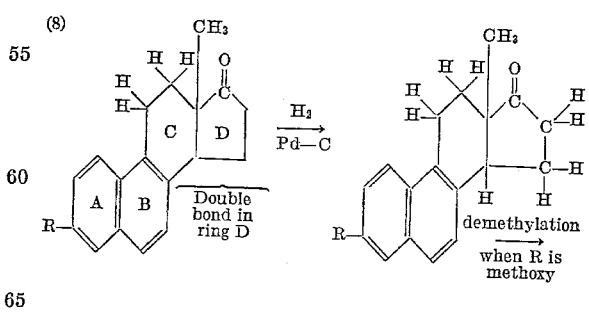

Reactions 6 and 7 may be combined into a single step which involves both hydrolysis as in reaction 6 and decarboxylation as in reaction 7, by treatment with a mixture of a lower-aliphatic acid and a mineral acid, conveniently acetic and hydrochloric acids; although in the event where R is alkoxy or aralkoxy, it may be dealkylated to hydroxy. For example, 15-carboethoxy-14,15-dehydrodesoxyequilenin is treated with a mixture of acetic and hydrochloric acids to give directly the mixture of two isomeric dehydrodesoxyequilenins, as follows:

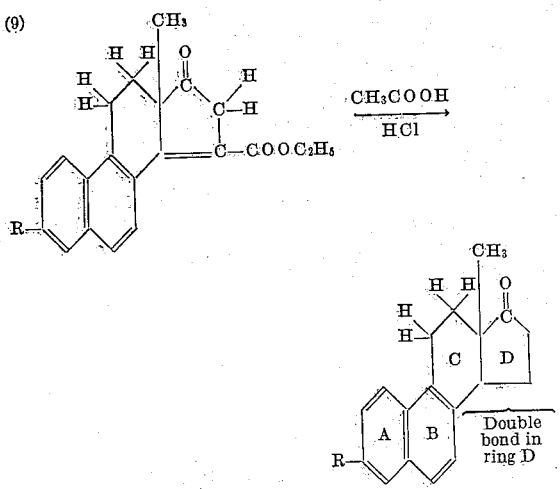

The following are examples of the process of the present application, and the products obtained thereby—obtained by the first four of the five steps of the complete steroid synthesis. The melting points given are all corrected for stem exposure.

*Example 1.—The preparation of 15-carboxy-15,16-dehydroequilenin methyl ethers, useful for preparing equilenin*

To a suspension of powdered sodium methoxide, (prepared by dissolving 3.39 g. of sodium in methanol, removing excess methanol by evaporation under reduced pressure, and heating at approximately 200° C. for one hour under high vacuum) in 70 cc. of dry benzene, is added 10.90 g. of ethyl formate; after which is added a solution of 16.54 g. of 1-keto-7-methoxy-1,2,3,4-tetrahydrophenanthrene in 110 cc. of benzene. The system containing the mixture is evacuated; and then filled with nitrogen, and allowed to stand at room temperature for about 5 hours, with occasional swirling. A copious yellow precipitate is formed. This precipitate is dissolved by shaking with ether and ice water, and then allowing the whole to separate into two layers. The water layer, which contains the 1-keto-7-methoxy-2-hydroxymethylene - 1,2,3,4 - tetrahydrophenanthrene in the form of the sodio derivative, is separated from the ether layer and preserved; and for complete recovery the ether layer is desirably washed thoroughly with water and with dilute potassium hydroxide solution and the washings added to the separated aqueous layer. The combined aqueous solution is then acidified, to cause separation of the 1-keto-2-hydroxymethylene-7-methoxy - 1,2,3,4 - tetrahydroxyphenanthrene, as yellow crystals. As first obtained, these give a yield of about 17.73 g. (or 95%), melting at about 130–131.5° C.; which is of satisfactory purity for the next step. The crystals may be purified if desired, as by recrystallization several times with alcohol; but the melting point is not materially changed, although somewhat sharpened, for the recrystallized crystals have a melting point of 130–130.6° C.

Analysis shows the following: Calculated for $C_{16}H_{14}O_3$: C, 75.57%; H, 5.55%. Found: C, 75.37%; H, 5.68%.

The yellow crystalline 1-keto-2-hydroxymethylene-7-methoxy-1,2,3,4 - tetrahydrophenanthrene thus obtained is used as the starting point for the next step. The 17.73 g. of that hydroxymethylene ketone is dissolved in about 400 cc. of glacial acetic acid, and the solution is stirred with 7.25 g. of dry powdered hydroxylamine hydrochloride at about 68–70° C. (the temperature of solution) for about 7 hours. The solution becomes pink. The hot pink solution is diluted with about an equal volume of hot water to the point of incipient cloudiness, and then allowed to cool; and on such cooling a deposit is obtained of usually colorless (although sometimes colored) crystals of 10,11-dihydro- 7 -methoxyphenanthro[2,1-d]isoxazole. The yield is about 15.81 g. (or about 90%), after drying at 100–110° C. The melting point is about 137–138° C., with softening preceding melting. Purification may be obtained by evaporative distillation at 150° C. at 0.5 to 1 mm. pressure, followed by recrystallization from a mixture of methanol and ethyl acetate; which gives colorless crystals melting at 139.5–140° C.

Analysis shows the following: Calculated for $C_{16}H_{13}O_2N$: C, 76.47%; H, 5.21%. Found: C, 76.71%; H, 5.07%.

The crude isoxazole may contain a small amount of a benzene-insoluble material, possibly a phenolic product resulting from demethylation; but is nevertheless sufficiently pure for the next step.

The above procedure may be conveniently altered in the following way: A mixture of 16.87 g. of the crude 1 - keto - 2 - hydroxymethylene-7-methoxy-1,2,3,4-tetrahydrophenanthrene, 400 cc. of glacial acetic acid, and 6.91 g. of hydroxylamine hydrochloride, is quickly heated to boiling in an oil bath maintained at about 170° C. The refluxing is then continued for about 7 minutes, whereupon the solution (which is now red) is diluted with hot water until definitely turbid. The whole is then allowed to cool several hours in an ice box, during which time crystallization of the 10,11 - dihydro - 7 - methoxyphenanthro[2,1-d]isoxazole occurs. The isoxazole as thus obtained is in the form of tan-colored plates melting at about 137–138° C., and the yield is about 15.80 g. (about 95%).

The next step may be either in two parts or in one part.

If it is in two parts, it is as follows:

FIRST PART

To a cool solution of 0.9 g. of sodium in 11 cc. of methanol is added a filtered solution of 6.66 g. of the crude 10,11 - dihydro-7-methoxyphenanthro[2,1-d]isoxazole in 80 cc. of dry benzene. The mixture is stirred during the addition, which should take about 10 minutes, and then is stirred for about 3 hours longer, all at room temperature. Ether is added, and the mixture is shaken with successive portions of water (desirably about 1.5 liters in all). The water dissolves the product of the reaction, which is 2-cyano-1-keto-7-methoxy-2-sodio-1,2,3,4 - tetrahydrophenanthrene and is sparingly water-soluble. The water and ether layers are allowed to stand, so that they separate; and the water layers are removed and preserved. For increased yield, the ether layer is desirably extracted with dilute potassium hydroxide solution, and the extract is combined with the separated water layers. The combined aqueous extract is then acidified, as with hydrochloric acid; and gives about 6.23 g. (94% yield) of a yellow solid, 2-cyano-1-keto-7-methoxy-1,2,3,4-tetrahydrophenanthrene, melting at about 164–168.5° C. Although this is sufficiently pure for the remainder of the process, it may be purified; as by vacuum sublimation, followed by recrystallization from alcohol, to give yellow plates melting at 169.5–171° C. Analysis of the purified product shows the following:

Calculated for $C_{16}H_{13}O_2N$: C, 76.47%; H, 5.21%. Found: C, 76.28%; H, 5.38%.

SECOND PART

For this part, 6.00 g. of the crude 2-cyano-1-keto-7-methoxy-1,2,3,4-tetrahydrophenanthrene and 30 cc. of dry benzene are added to a solution of 2.64 g. of sodium in 50 cc. of methanol; and the whole is refluxed for 15 minutes, with stirring. The mixture is cooled, 8 cc. of methyl iodide is added, and the stirring is continued at room temperature for about 45 minutes. Then an additional 8 cc. of methyl iodide is added, and the stirring is continued until solution is practically complete, which usually takes about 2 or 3 hours. The solution is then heated under reflux conditions, for about 2 hours, to complete the reaction; and a few drops of acetic acid are added to neutralize the mixture, after which most of the solvent is removed by evaporation in a current of air. Then about 100 cc. of water is added; after which the product is extracted with a mixture of benzene and ether, the organic layer is separated from the water layer, and the solution thus obtained is successively washed thoroughly with water, several portions of dilute potassium hydroxide solution, and saturated salt solution. The benzene-ether solution is then dried over anhydrous potassium carbonate; and then the solvent is removed by evaporation to leave a solid residue; which is crystallized from alcohol. This gives about 5.05 g. (an 80% yield) of pale yellow crystals, melting at about 132.5–134.5° C. preceded by a softening at about 130° C. This product, which is 2-cyano-1-keto-7-methoxy-2-methyl-1,2,3,4-tetrahydrophenanthrene, is sufficiently pure for use for the remainder of the process. The yellow crystals may be purified if desired, however, by evaporative distillation at 150° C. under a pressure of 0.5 to 1 mm., followed by recrystallization from ethyl acetate; which gives colorless needles melting at 135–137.5° C. Analysis of the purified product shows the following: Calculated for $C_{17}H_{15}O_2N$: C, 76.96%; H, 5.70%. Found: C, 77.10%; H, 5.90%.

If it is desired to produce the 2-cyano-1-keto-7-methoxy-2-methyl-1,2,3,4-tetrahydrophenanthrene in one step from the 10,11-dihydro-7-methoxyphenanthro[2,1-d]isoxazole, it may be done by direct methylation as follows:

To a cool solution of sodium methylate, formed by dissolving 7.5 g. of sodium in 65 cc. of methanol is added, with stirring, a solution of 10.0 g. of the crude isoxazole in 100 cc. of dry benzene. The addition is made slowly, so that it takes about 20 minutes. The sodio derivative of the desired cyano compound is formed, as indicated by the appearance of a yellow precipitate. The mixture is then stirred at room temperature for about 45 minutes. Then 15 cc. of methyl iodide is added, without any preliminary separation, and the mixture is stirred for about 1 hour; and then 10 cc of methyl iodide is introduced, and the stirring is continued for about one-half hour. Then 5 cc. of methyl iodide is added, and the whole is refluxed for about 2½ hours, and the solution is worked up as described in the preceding two-step process following the addition of the methyl iodide. In this one-step method, the 2-cyano-1-keto-7-methoxy-2-methyl-1,2,3,4-tetrahydrophenanthrene is obtained directly as almost colorless crystals, melting at about 135–137° C., with a yield of about 9.25 g., or about 88% of the theoretical amount.

A second crop of crystals may if desired be obtained from the mother liquor. These crystals are undoubtedly a mixture, melting at about 100–120° C., and we are not sure what they are.

The 2-cyano-1-keto-7-methoxy-2-methyl-1,2,3,4-tetrahydrophenanthrene, whether obtained by the two-step or the one-step process, may be used as the starting point for the next step, to produce a 15-carboalkoxy-14,15-dehydroequilenin methyl ether. We have not seen any evidence of the shifting of the position of the double bond in ring D at this stage.

The 15-carboethoxy compound is prepared as follows:

A solution is made of 1.08 g. of potassium in 40 cc. of tertiary-butyl alcohol. The system containing the solution is evacuated of air and filled with nitrogen, and then there are successively added (a) 6.8 cc. of diethyl succinate, and (b) 3.30 g. of the crude 2-cyano-1-keto-7-methoxy-2-methyl-1,2,3,4-tetrahydrophenanthrene; which latter is conveniently transferred with the aid of an additional 15 cc. of tertiary-butyl alcohol. The system is desirably again evacuated, and refilled with nitrogen. Then the mixture is heated in an oil bath maintained at 50–55° C. for about 7 hours; with suitable stirring (such as magnetic stirring) which will not interfere with the maintenance of the system under nitrogen. Then the mixture is cooled, and poured into excess dilute hydrochloric acid; after which the tertiary-butyl alcohol is removed by evaporation at reduced pressure, leaving a solid organic residue. A small amount of water is added, and then that solid organic residue is taken up in a mixture of benzene and ether, and the water and benzene-ether layers are allowed to separate on standing and the water layer is discarded; and the benzene-ether layer is washed successively with dilute hydrochloric acid, water, two 50 cc. portions of 5% potassium hydroxide solution (which removes some but very little acidic material), once again with water, and finally with saturated salt solution. The thus-washed benzene solution is dried over anhydrous sodium sulfate, and concentrated by evaporation to a small volume. Then methanol is added, which causes the desired 15-carboethoxy-14,15-dehydroequilenin methyl ether to crystallize in the form of pale yellow fluffy needles, which melt at about 179–183° C., after some preliminary softening at about 176° C. The yield is about 2.27 g. or about 52%. This methyl ether is of sufficient purity for the succeeding step in the synthesis. It may be purified, however, if desired, by recrystallizing from benzene-methanol, and subliming at 160° C. under a pressure of 0.5 to 1 mm., followed by recrystallization from ethyl acetate. This yields colorless felted needles melting at 183.6–184.2° C. Analysis of the purified product shows: Calculated for $C_{22}H_{22}O_4$: C, 75.41%; H, 6.33%. Found: C, 75.64%; H, 6.47%.

The 15-carbomethoxy compound is prepared as follows:

A three-neck flask is fitted with a dropping funnel and a gas-tight stirrer (to enable evacuation of the system). The third neck of the flask is connected by pressure tubing to the top of the dropping funnel and to a three-way stop-cock, which will enable evacuation and admission of nitrogen gas.

In the funnel is placed a solution of 4.0 g. of potassium in 100 cc. of pure, dry tertiary-butyl alcohol; and 15 cc. of dimethyl succinate is then mixed with this solution. In the flask is placed 4.00 g. of crude, dry 2-cyano-1-keto-7-methoxy-2-methyl-1,2,3,4-tetrahydrophenanthrene, and the whole system is evacuated and filled with nitrogen. About 20 cc. of the solution in the funnel is then admitted to the flask. The mixture is then slowly stirred for 1 hour while the flask is heated in an oil bath maintained at about 53° C.; during which time the color develops from almost colorless to orange. The remaining contents of the funnel is now added dropwise, at such a rate that addition is complete after about 4 hours, and the stirring and heating are continued as before during this period and for about 1 more hour after the addition is complete. The reaction mixture, which has now become bright yellow and pasty, is then cooled, and treated with 100 cc. of 6 N hydrochloric acid; which gives a clear orange solution. The tertiary-butyl alcohol is removed in a current of nitrogen, water is added, and the suspension of yellow solid is extracted twice with benzene and the two benzene extracts combined. The combined benzene solution is washed with dilute hydrochloric acid, with water, with dilute potassium hydroxide solution, and finally several times with water. The benzene is then evaporated, as on a steam bath, in a current of nitrogen; which leaves a light yellow solid. This is triturated with petroleum ether, after which there remains about 4.06 g. (an 80% yield) of light yellow crytalline 15-carbomethoxy-14,15-dehydroequilenin methyl ether melting at about 164–167° C. This methyl ether is of satisfactory purity for the next step; but it may be further purified, if desired, by recrystallization from methanol, which finally gives colorless plates melting at 170–171° C.

The analysis shows: Calculated for $C_{21}H_{20}O_4$: C, 74.98%; H, 5.99%. Found: C, 74.72%; H, 6.04%.

The 15-carbo-tertiary-butoxy-14,15-dehydroequilenin methyl ether is prepared as follows: To a solution of 0.16 g. of potassium in 6 cc. of dry tertiary-butyl alcohol is added a solution of 1.4 g. of di-tertiary-butyl succinate in 5 cc. of dry benzene. To this mixture is then added a solution of 0.500 g. of crude 2-cyano-1-keto-7-methoxy-2-methyl-1,2,3,4-tetrahydrophenanthrene in 15 cc. of dry benzene, and the whole system is evacuated and filled with nitrogen. The benzene solution, which becomes red, is refluxed for 1¼ hours; and is then treated with dilute hydrochloric acid as described in the procedure for making the 15-carbomethoxy product. The desired final 15-carbo-tertiary-butyl product is obtained in crude form by evaporation of the benzene, and is an orange-red oil; which is dissolved in 15 cc. of hot methanol and allowed to crystallize. The yield is about 0.094 g. (or 13%), of red plates melting at about 177–187° C. Purification may be obtained by sublimation at high vacuum and recrystallization from methanol. As thus obtained it is in the form of colorless needles melting at 191.5–193° C.

The analysis shows: Calculated for $C_{24}H_{26}O_4$: C, 76.16%; H, 6.93%. Found: C, 75.60%; H, 6.97%.

Any of these 15-carboalkoxy-14,15-dehydroequilenin methyl ethers may be hydrolyzed to convert the carboalkoxy group at the 15-position to a carboxy group; and during this hydrolysis a surprising shifting of the double bond in ring D occurs, from the 14–15 position to the 15–16 position, to make the reaction product a 15-carboxy-15,16-dehydroequilenin methyl ether. For instance, a mixture of 2.27 g. of the crude 15-carboethoxy-14,15-dehydroequilenin ether obtained as above, and 2.27 g. of barium hydroxide octahydrate in 26 cc. of water and 34 cc. of alcohol, is boiled under reflux conditions in an atmosphere of nitrogen for one hour. This makes a pink solution, which is concentrated under reduced pressure until crystallization begins; which crystallization is of the sparingly soluble barium salt of the 15-carboxy compound. The solution is cooled, and the barium salt is recovered by filtration and washed with water. The filtrate still contains a small amount of the varium salt; which can be recovered as the 15-carboxy acid by acidification of that filtrate, as with hydrochloric acid. The solidified barium salt may be converted into the 15-carboxy acid by warming it with about 350 cc. of dilute hydrochloric acid. This acid is the desired 15-carboxy-15,16-dehydroequilenin methyl ether; and after being washed with water it melts at about 194–195° C. with decomposition, preceded by some softening at about 185° C. This 15-carboxy-15,16-dehydro product, which is obtained in almost quantitative yield from the 15-carboethoxy-14,15-dehydro compound, is satisfactory for the next step of the synthesis. It may be purified somewhat, however, by being recrystallized three times from benzene and dried at 55–60° C. at about 5 mm. pressure for about 20 hours; which gives pale yellow crystals melting at 196.5–197.5° C. with decomposition. The analysis shows: Calculated for $C_{20}H_{18}O_4$: C, 74.52%; H, 5.63%. Found: C, 75.01%; H, 5.49%.

The hydrolysis may also be effected by an alternative procedure; which for the 15-carbomethoxy-14,15-dehydro compound is as follows:

To a suspension of 4.06 g. of the crude 15-carbomethoxy-14,15-dehydroequilenin methyl ether in 46 cc. of water and 60 cc. of alcohol is added 4.06 g. of barium hydroxide octahydrate. The system is evacuated and filled with nitrogen, and is then refluxed for one hour. The pink solution is concentrated under reduced pressure until precipitation is obtained of the relatively insoluble barium salt of the 15-carboxy-15,16-dehydro acid. The whole is then cooled, and mixed with about 600 cc. of about 6 N hydrochloric acid, and the mixture is then heated on the steam bath for about 1½ hours, to convert the barium salt into the 15-carboxy-15,16-dehydro acid; which is an orange crystalline product. This is separated by filtration, and without drying is recrystallized from benzene; which gives about 3.77 g. (a 97% yield) of light orange crystals of 15-carboxy-15,16-dehydroequilenin methyl ether, melting at about 194.5–196.5° C. It is desirable to dry the final product overnight at 100° in order to completely remove the benzene.

The 15-carboxy-15,16-dehydroequilenin methyl ether is the starting point for the fifth step of the complete synthesis of equilenin, involving a decarboxylation, a hydrogenation and a resolution of isomers, all of which are outlined in the general description given above and are set forth in detail in the aforesaid parent application Serial No. 700,380, of which this application is a division.

*Example 2.—The preparation of 15-carboxy-15,16-dehydrodesoxyequilenin, useful for preparing desoxyequilenin*

To a suspension of powdered sodium methoxide, (prepared by dissolving 1.28 g. of sodium in methanol, removing the excess methanol by evaporation under reduced pressure, and heating at approximately 200° C. for 1 hour under high vacuum), in 100 cc. of dry benzene, is added 4.12 g. of ethyl formate; after which is added a solution of 5.40 g. of 1-keto-1,2,3,4-tetrahydrophenanthrene in 50 cc. of benzene. The system containing the mixture is evacuated, and then filled with nitrogen and allowed to stand at room temperature for about four hours, with occasional swirling. During this time the mixture very slowly assumes a slight pink tinge and gradually becomes very viscous. Cold water is then added, followed by a small amount of ether to minimize formation of emulsions, and the whole is shaken well and then allowed to separate into two layers. The water layer, which contains 1-keto-2-hydroxymethylene-1,2,3,4-tetrahydrophenanthrene in the form of its sodio derivative, is separated from the ether layer and preserved; and for complete recovery the ether layer is desirably washed thoroughly with water and with dilute potassium hydroxide solution and the washings added to the separated aqueous layer. The combined aqueous solution is then acidified, to cause the separation of the 1-keto-2-hydroxymethylene-1,2,3,4-tetrahydrophenanthrene, as a light-yellow solid. The yield of this product is about 5.82 g. (or 94%), and the melting point is about 82–83° C. This corresponds fairly closely with the melting point reported by Meyer and Reichstein for the same compound produced by a different procedure. See Pharmaceutical Acta Helvetiae, vol. 19, page 128 et seq., published in 1944.

The 1-keto-2-hydroxymethylene-1,2,3,4-tetrahydrophenanthrene thus obtained is used as the starting point for the next step: 21.5 g. of that hydroxymethylene ketone is dissolved in about 410 cc. of glacial acetic acid, and the solution is stirred with 9.75 g. of dry powdered hydroxylamine hydrochloride at about 85° C. for about 6 hours. Sufficient crushed ice is then added to bring the volume of solution to about 2 liters. When the ice has melted, there is present a light pink solid, which is filtered off and dried in an oven at about 60° C. This solid is 10,11-dihydrophenanthro[2,1-d]isoxazole; it amounts to about 20 g. (a 94% yield), and has a melting point of about 104–107° C. This material is of satisfactory purity for the next step in the synthesis. Purification may be obtained if desired, by recrystallization from dilute alcohol; which gives colorless crystals melting at 109.8–110.5° C.

Analysis shows the following: Calculated for $C_{15}H_{11}ON$: C, 81.42%; H, 5.01%; N, 6.33%. Found: C, 81.71%; H, 4.90%; N, 6.48%.

The next step may be either in two parts or in one part.

If it is in two parts, it is as follows:

FIRST PART

To a cool solution of 3.2 g. of sodium in 40 cc. of methanol is added a solution of 20 g. of crude 10,11-dihydrophenanthro[2,1-d]isoxazole in 250 cc. of dry benzene. A yellow precipitate of 2-cyano-1-keto-2-sodio-1,2,3,4-tetrahydrophenanthrene separates as the solution is allowed to stand at room temperature for about 30 minutes. Ether is added, and the mixture is shaken with about 1 liter of water. The water and ether layers are allowed to stand, so that they separate; and the water layer is removed and preserved. In order to recover more material from the ether layer, it is washed with successive portions of dilute sodium hydroxide, (desirably a total of about 4 liters), and these washings are all combined with the aqueous extract and then acidified, as with hydrochloric acid. This gives about 18.8 g. (a 95% yield) of light tan 2-cyano-1-keto-1,2,3,4-tetrahydrophenanthrene, melting at about 125–126.5° C. Although this is sufficiently pure for the remainder of the process, it may be purified by recrystallization from dilute alcohol, which gives colorless plates melting at 128–129° C.

The analysis shows: Calculated for $C_{15}H_{11}ON$: C, 81.42%; H, 5.01%; N, 6.33%. Found: C, 81.68%; H, 4.96%; N, 6.39%.

SECOND PART

For the next step, 18.8 g. of the crude 2-cyano-1-keto-1,2,3,4-tetrahydrophenanthrene dissolved in 67 cc. of warm benzene is added to a solution of 7.3 g. of sodium in 110 cc. of methanol; and the whole is refluxed for 15 minutes, with stirring. The mixture is cooled, 11 cc. of methyl iodide is added, and the stirring is continued at room temperature for about 45 minutes. Then an additional 11 cc. of methyl iodide is added, and the solution is allowed to stand for about 30 minutes. Finally 5 cc. more of methyl iodide is added, and the solution is refluxed for 1½ hours to complete the reaction. The solvents are then removed under reduced pressure, and the residue is dissolved in benzene and is washed thoroughly with several portions of dilute potassium hydroxide solution. The benzene solution is then dried over anhydrous potassium carbonate; and the solvent is removed by evaporation to leave a solid residue, which is crystallized from methanol. This gives a total of about 16.7 g. (a yield of 83%) of material melting at about 121–127° C. This product is 2-cyano-1-keto-2-methyl-1,2,3,4-tetrahydrophenanthrene, and is sufficiently pure for use for the remainder of the process. The material may be purified if desired, however, by recrystallization from methanol; which gives colorless plates melting at 126–127° C. Analysis of the purified product shows the following: Calculated for $C_{16}H_{13}ON$: C, 81.67%; H, 5.57%. Found: C, 81.70%; H, 5.58%.

If it is desired to produce the 2-cyano-1-keto-2-methyl-1,2,3,4-tetrahydrophenanthrene in one step from the 10,11-dihydrophenanthro[2,1-d]-isoxazole, it may be done by direct methylation as follows:

To a cool solution of 0.6 g. of sodium in 28 cc. of methanol is added a solution of 4.7 g. of the crude isoxazole in 17 cc. of benzene. This solution is allowed to stand for 30 minutes at room temperature, and is then refluxed for 10 minutes and cooled. To this cool solution is now added 3 cc. of methyl iodide; and the mixture is shaken, and then allowed to stand at room temperature for 1 hour. A second portion (2 cc.) of methyl iodide is then added, and the solution is allowed to stand for 2 hours at room temperature, and then is refluxed for 4 hours. The reaction mixture is worked up as described in the preceding 2-step process following the addition of the methyl iodide. In this 1-step method, the 2-cyano-1-keto-2-methyl-1,2,3,4-tetrahydrophenanthrene is obtained directly in about 91% yield. The weight is about 4.55 g. and the melting point is about 124.5–126° C.

The 2-cyano-1-keto-2-methyl-1,2,3,4-tetrahydrophenanthrene, whether obtained by the 2-step process or the 1-step process, may be used as the starting point for the next step, to produce 15-carboethoxy-14,15-dehydrodesoxyequilenin. This is done as follows:

To a cool solution of 0.74 g. of potassium dissolved in 30 cc. of dry tertiary-butyl alcohol is added 6.6 cc. of diethyl succinate, followed by 2.00 g. of crude 2-cyano-1-keto-2-methyl-1,2,3,4-tetrahydrophenanthrene. The system containing the solution is evacuated, filled with nitrogen, and then stoppered and shaken mechanically for 7 hours. After the first 3 hours nearly all of the solid material is in solution and the reaction mixture is deep red; by the end of the shaking period, however, a light yellow precipitate has formed. An excess of dilute hydrochloric acid is added to the mixture, and most of the solvent is then removed under reduced pressure. A small amount of water is added, then the organic residue is taken up in a mixture of benzene and ether, and the water and benzene-ether layers are allowed to separate on standing and the water layer is discarded; and the benzene-ether layer is washed successively with dilute hydrochloric acid, water, three portions of dilute potassium hydroxide solution, once again with water, and finally with saturated salt solution. The thus-washed benzene solution is dried over anhydrous sodium sulphate and concentrated to a small volume under reduced pressure, to leave a residual light red oil. This is diluted with hot methanol. 15-carboethoxy-14,15-dehydrodesoxyequilenin slowly crystallizes out as the solution cools, as a light pink product; which amounts to about 1.50 g., and melts at about 151–153.5° C. This 15-carboethoxy-14,15-dehydro material is of sufficient purity for the next step in the synthesis. The product may be purified, however, if desired, by recrystallization from methanol; which gives faintly pink crystals melting at 152.5–153.5° C.

The analysis shows: Calculated for $C_{21}H_{20}O_3$: C, 78.74%; H, 6.29%. Found: C, 78.55%, 78.49%; H, 6.23%, 6.22%.

The 15-carboethoxy-14,15-dehydrodesoxyequilenin is now hydrolyzed, in almost quantitative yield, to 15-carboxy-15,16-dehydrodesoxyequilenin; which involves not only a conversion of the carboethoxy group at the 15-position to a carboxy group, but a shifting of the double bond in ring D from the 14–15 position to the 15–16 position. To do this a mixture of 1.00 g. of the crude 15-carboethoxy-14,15-dehydro compound just obtained, and 1.00 g. of barium hydroxide octahydrate in 25 cc. of 80% alcohol, is boiled under reflux conditions in an atmosphere of nitrogen for 1½ hours. The resulting solution is concentrated under reduced pressure, and the residue is acidified with excess dilute hydrochloric acid; which effects the precipitation of an oil. This oil is extracted with ether, and the ether solution is in turn extracted with a saturated solution of sodium bicarbonate. Acidification of the sodium bicarbonate extract, as by hydrochloric acid, gives about 0.88 g. (a 97% yield) of light yellow crystals of 15-carboxy-15,16-dehydrodesoxyequilenin, which melts at about 228–231° C. with decomposition. This 15-carboxy acid may be purified, if desired, by recrystallization from alcohol.

The analysis shows: Calculated for $C_{19}H_{16}O_3$: C, 78.06%; H, 5.52%. Found: C, 77.76%; H, 5.44%.

The dehydrodesoxyequilenins may be prepared by decarboxylation of this 15-carboxy acid; but it is also convenient to prepare them directly from 15-carboethoxy-14,15-dehydrodesoxyequilenin. This is accomplished by the fifth step of the complete synthesis of desoxyequilenin, which is outlined in the general description given above and is set forth in detail in the aforesaid parent application Serial No. 700,380, of which this application is a division.

We claim as our invention:

1. The process of producing a 15-carboalkoxy-14,15-dehydroequilenin compound, which consists in condensing a 2-cyano-1-keto-7-R-2-methyl-1,2,3,4-tetrahydrophenanthrene, in which R is a member of the class consisting of hydrogen and lower alkoxy groups, with a di-lower-alkyl succinate, in the presence of an alkali-metal tertiary-lower-alkoxide.

2. The process as set forth in claim 1, in which the dialkyl succinate is dimethyl succinate.

3. The process as set forth in claim 1, in which the dialkyl succinate is diethyl succinate.

4. The process as set forth in claim 1, in which the alkali-metal tertiary-lower-alkoxide is potassium tertiary-butoxide.

5. A 15-lower-carboalkoxy-14,15-dehydroequilenin ether, in which the ether group is a lower alkoxy group.

6. 15-carbomethoxy-14,15-dehydroequilinen methyl ether.

7. 15-carboethoxy-14,15-dehydroequilenin methyl ether.

8. 15-carbo-tertiary-butoxy-14,15-dehydroequilenin methyl ether.

9. A 15-lower-carboalkoxy-14,15-dehydrodesoxyequilenin.

10. 15-carboethoxy-14,15-dehydrodesoxyequilenin.

11. The process of producing a 15-carboxy-15,16-dehydroequilenin compound, which consists in hydrolyzing a 15-carboalkoxy-14,15-dehydroequilenin compound.

12. The process as set forth in claim 11, in which the hydrolysis is carried out with barium hydroxide followed by hydrochloric acid.

13. 15-carboxy-15,16-dehydroequilenin methyl ether.

14. A 15-lower-carboalkoxy-3-R-14,15-dehydroequilenin compound, in which R is a member of the class consisting of hydrogen and lower alkoxy groups.

15. A 15-lower-carboalkoxy-3-R-14,15-dehydroequilenin compound as set forth in claim 14, in which the lower-carboalkoxy group is the carbomethoxy group.

16. A 15-lower-carboalkoxy-3-R-14,15-dehydroequilenin compound as set forth in claim 14, in which the lower-carboalkoxy group is the carboethoxy group.

17. A 15-lower-carboalkoxy-3-R-14,15-dehydroequilenin compound as set forth in claim 14, in which the lower-carboalkoxy group is the carbo-tertiary-butoxy group.

18. A 15-carboxy-3-R-15,16-dehydroequilenin compound in which R is a member of the class consisting of hydrogen and lower alkoxy groups.

19. A 15-R'-3-R-dehydroequilenin compound which has a double bond in ring D extending from the 15 position, and in which R is a member of the class consisting of hydrogen and lower alkoxy groups, and R' is a

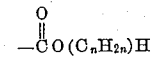

group in which $n$ is an integer between 0 and 4 inclusive.

WILLIAM S. JOHNSON.
JACK W. PETERSEN.
CARL DAVID GUTSCHE.

(References on following page)

REFERENCES CITED

The following references are of record in the file of this patent:

UNITED STATES PATENTS

| Number | Name | Date |
|---|---|---|
| 2,265,417 | Bockmuhl | Dec. 9, 1941 |

OTHER REFERENCES

Bachmann, "Jour. Am. Chem. Soc.," vol. 62, pp. 2084–2088 (1940).

Certificate of Correction

October 31, 1950

Patent No. 2,528,001

WILLIAM S. JOHNSON ET AL.

It is hereby certified that error appears in the printed specification of the above numbered patent requiring correction as follows:

Column 1, lines 44 and 45, for "tetrahydrophenantherene" read *tetrahydrophenanthrene*; column 2, lines 13 to 17, inclusive, for that portion of the formula reading

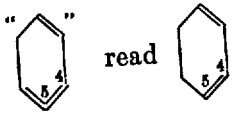

column 10, line 14, for "varium" read *barium*;
and that the said Letters Patent should be read as corrected above, so that the same may conform to the record of the case in the Patent Office.

Signed and sealed this 13th day of February, A. D. 1951.

[SEAL]

THOMAS F. MURPHY,
*Assistant Commissioner of Patents.*